Figure 1:
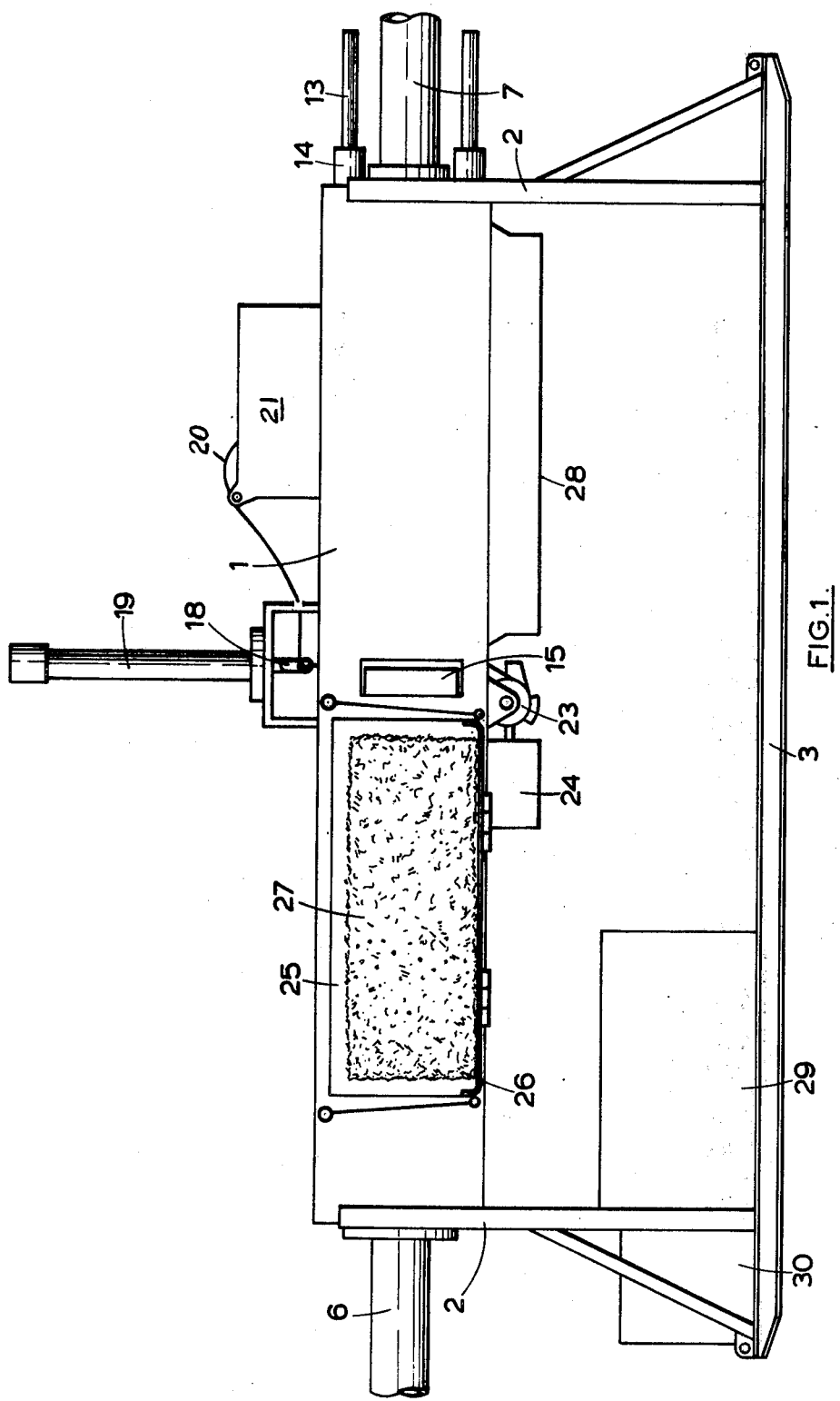

United States Patent [19]

Smee et al.

[11] 4,150,613

[45] Apr. 24, 1979

[54] APPARATUS FOR BALING HAY OR STRAW

[75] Inventors: Gordon E. A. Smee; Raymond W. Jackman, both of Braintree, England

[73] Assignee: Joseph Bradbury & Sons Limited, Essex, England

[21] Appl. No.: 871,458

[22] Filed: Jan. 23, 1978

Related U.S. Application Data

[63] Continuation of Ser. No. 745,849, Oct. 28, 1977, abandoned.

[30] Foreign Application Priority Data

Nov. 28, 1975 [GB] United Kingdom ............... 49067/75

[51] Int. Cl.² ............................................. B65B 13/20
[52] U.S. Cl. ....................................... 100/3; 100/100;
100/215; 100/218; 100/220; 100/244; 100/255
[58] Field of Search ..................... 100/3, 19, 215, 218,
100/220, 244, 245, 255, 100, 2

[56] References Cited

U.S. PATENT DOCUMENTS

| 378,197 | 2/1888 | Ertel ..................... 100/244 |
| 2,763,202 | 9/1956 | Gramelspacher .................... 100/244 |
| 3,994,418 | 11/1976 | Andersson ...................... 100/244 X |

FOREIGN PATENT DOCUMENTS 1480396 4/1967 France .................... 100/244

*Primary Examiner*—Billy J. Wilhite
*Attorney, Agent, or Firm*—Scrivener, Parker, Scrivener & Clarke

[57] ABSTRACT

Apparatus for increasing the density of conventional bales of fibrous agricultural produce such as hay or straw which comprises a compresson chamber of a suitable size to receive conventional bales. Driven by a compression ram having a preset stroke and preferably being hydraulic, and a movable backplate facing the piston and being provided with means for producing a reaction force in opposition to the compression force of the ram and less than the maximum compression force exertable by the ram. Means for binding the compressed bales is also provided. Preferably the reaction force is maintained constant regardless of displacement of the backplate and this can be achieved by using a second hydraulic ram to which fluid is supplied at a constant pressure.

5 Claims, 2 Drawing Figures

APPARATUS FOR BALING HAY OR STRAW

This is a continuation of application Ser. No. 745,849 filed Oct. 28, 1977, now abandoned.

SPECIFIC DESCRIPTION

This invention relates to apparatus for increasing the density of bales of fibrous material and in particular bales of agricultural produce such as hay or straw.

Hay and straw is normally gathered from the field by a baling machine which is drawn across the field by an agricultural tractor. The machine collects the hay or straw and compresses it into bales which are automatically bound with twine and ejected from the machine. Straw baled by a conventional baler has a density of approximately 120 kg/m$^3$, and the quantity of straw that can be transported on a vehicle is dictated by the volume capacity rather than the weight carrying capacity of the vehicle.

An object of the invention is to provide a machine that will increase the density of bales produced by a baler of conventional construction.

According to the present invention we provide apparatus for increasing the density of bales of a fibrous material comprising a compression chamber adapted to accept the bales, in the chamber a movable piston driven by a compression ram having a preset stroke, a movable backplate facing the piston and being provided with means for producing a reaction force in opposition to the compression force exerted by the ram and less than the maximum compression force exertable by the ram, and means for binding bales compressed in the chamber.

The apparatus of the invention may be designed to compress a standard size bale of straw 14"×18"×42" having a density of approximately 120 kg/m$^3$ as produced by conventional present day agricultural baling machines, into a compressed bale of one third the length of the original bale and, with a slight increase in cross-sectional dimensions, a density of approximately 300 Kg/m$^3$. Transportation and storage costs of such compressed bales are of course substantially lower than those of the less dense standard size bales since vehicles and barns can accommodate a much greater weight of produce per unit volume.

Preferably the ram is hydraulic and the reaction force is provided by a second hydraulic ram supplied with fluid at a constant pressure to keep the reaction force constant regardless of displacement of the backplate. The binder means may also be hydraulically operated, and the machine provided with a hydraulic power pack adapted to be driven by an agricultural tractor power take-off drive and hydraulic control means.

In order that several conventional bales can be compressed together retaining means may be provided to hold a bale in compression after operation of the compression ram and withdrawal of the piston. Thus one bale can be held unbound while a second is inserted into the machine, and preferably the machine is adapted to compress a total three conventional bales to one third of their original length. Three such high density bales bound together are the same size as a conventional bale and are suitable for stacking in the same way as conventional bales.

Figure 2:
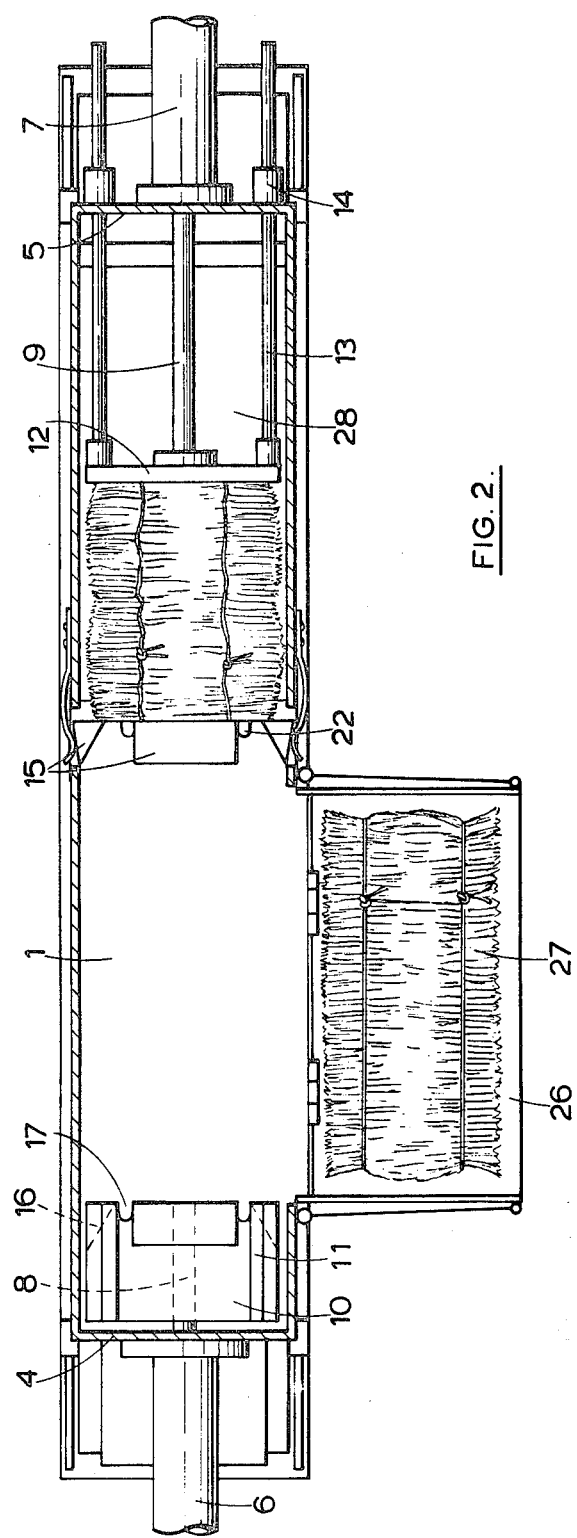

An embodiment of the invention will now be described, by way of example only, with reference to and as shown in the accompanying drawings, in which, FIG. 1 is a view, in elevation, of a machine for densifying conventional bales of hay or straw; and FIG. 2 is a plan view of the machine shown in FIG. 1 with the top omitted to show interior detail.

The machine shown in the drawings comprises a bale compression chamber 1 in the form of a rectangular tube having internal dimensions a little greater than the cross-sectional dimensions of the commonly accepted standard rectangular bale which is eighteen inches wide and fourteen inches deep. The compression chamber 1 is supported on four uprights 2 mounted on a pair of skids 3, the chamber being spaced above the skids by a distance greater than the depth of a bale. The compression chamber 1 is closed at each end by a plate 4,5. An hydraulic ram 6,7 is mounted centrally on each end plate co-axial with the compression chamber 1 and with its piston 13 rod 8,9 extending through an aperture in the associated end plate and into the compression chamber.

One ram, the left hand ram 6 as shown in the drawings, acts as a compression ram and carries a rectangular piston 10 on the end of its piston rod 8. The piston 10 is slightly smaller in cross-section than the interior of the compression chamber 1 but is provided with rubbing strips 11 which contact the chamber walls to guide the piston. This arrangement of loose-fitting piston 10 reduces the risk of the piston being jammed by loose material in the chamber 1 and by making the rubbing strips 11 somewhat resilient allows for minor manufacturing inaccuracies in the straightness of the chamber walls. The other ram 7 acts as a means of relief by controlling a movable backwall 12 comprising a plate mounted on the end of the piston rod 9 of this ram. The movable backwall is also of dimensions slightly smaller than the cross-sectional dimensions of the chamber interior but is provided with four guide rods fixed to its rear face and running in guide bushes 14 mounted on the right-hand end plate 5 of the chamber.

The compression ram 6 is of the double acting type and has a fixed stroke which is greater than the length of a standard bale, that is forty-two inches. However it should be noted that although the cross-sectional dimensions of conventional bales vary little from the standard dimensions considerable variations in length may occur and hence it is desirable that the compression ram has a stroke of at least forty-eight inches. At the forwardmost point of the advance of the piston 10 a spring-loaded chock 15 is provided in each wall of the chamber. The chocks 15 are arranged so that as a bale is moved along the compression chamber and compressed by the compression ram the chocks are deflected outwardly but spring back to retain the compressed bale is place once the ram is fully extended. Suitable recesses 16 are formed in the face of the piston 10 to allow the chocks 15 to spring back before the ram is withdrawn.

Two further recesses 17 are also provided in the face of the piston 10 to accommodate the needles 18 of a binder mechanism. The needles 18 comprise piston rods of a pair of hydraulic rams 19 mounted vertically side-by-side on top of the compression chamber 1 and drawing twine 20 from an adjacent box 21. On extension of the rams 19 the needles 18 pass downwards through apertures 22 in the top and bottom walls of the chamber to reach a knotter device 23 which is of a well known form and is mounted on the underside of the chamber together with a motor 24 which is preferably hydraulic. The mode of operation of this binder mechanism is well known in the art and will not be further described.

The relief ram 7 is also double acting and in the fully extended state holds the movable backwall 12 at a distance of one third of the length of a standard bale from the forwardmost position of the face of the compression piston 10. When the backplate 12 is thus positioned and during compression of bales, the relief ram is pressurized constantly to produce a maximum reaction force at the backplate 12 sufficient to compress conventional bales to one third of their length. The force which can be exerted by the compression ram 6 under full load is greater than the maximum reaction force available at the backplate 12. The stroke of the relief ram 7 is equal to approximately the length of a standard bale giving a maximum distance between the compression piston 10 when extended and the backplate 12 considerably greater than the length of a standard bale.

An inlet opening 25 is provided in one side wall of the chamber 1 extending between the piston 10 and the chocks 15. A cover plate 26 for the opening 25 is connected along its lower edge by hinges to the compression chamber 1. When open the cover plate 26 acts as a platform onto which a bale 27 can be placed ready to be pushed sideways through the inlet opening 25 into the compression chamber 1. An outlet opening 28 is provided in the floor of the chamber extending between the chocks 15 and the position of the backplate 12 when withdrawn.

The machine also includes an hydraulic power pack 29 and hydraulic control gear 30. The power pack 29 includes an hydraulic pump, oil reservoir and an accumulator. The pump is preferably arranged to be driven by an agricultural tractor by way of one of the tractor's standard power take-off drive shafts. Alternatively, or in addition, an electric motor may be included in the power pack to drive the pump.

The machine operates as follows. Starting with the compression ram 6 fully withdrawn and the relief ram 7 fully extended a bale is inserted into the compression chamber 1 by way of the inlet opening 25. Operation of the machine is then initiated. This may be done, for example, by an hydraulic control valve opened only on closure of the cover plate 26 thus avoiding the possibility of an operator being caught in the machine. The compression ram 6 then advances, the piston 10 compressing the bale against the backplate 12. Provided the bale is of average density, about 120 Kg/m$^3$ in the case of conventional straw bales, the backplate 12 remains unmoved and the bale is compressed to one third of its original length. There will be slight lateral expansion of the bale and in the case of straw bales the density will be increased to about 300 Kg/m$^3$. Should the bale initially be of unusually high density, contain an incompressible object, or have an initial length greater than the standard length, on compression the density will rise to 300 Kg/m$^3$, or be prevented from rising by the object, before the compression ram 6 completes its stroke. In this case the backplate 12 is pushed back sufficiently to allow completion of the compression stroke but the relief ram 7 maintains a constant reaction force on the backplate during and after movement. During compression the chocks 15 are pushed out of the chamber 1 by the advancing bale but spring back behind the bale, as shown in FIG. 2, to retain the compressed bale in place while the piston 10 is withdrawn.

The cover plate 26 can now be re-opened, or re-open automatically, and a second bale is introduced into the compression chamber 1. A further compression stroke is initiated. The second bale is compressed against the first bale and the backplate 12 is pressed back continually during compression. The relief ram 7 continues to exert a constant reaction force on the backplate 12. The piston 10 is withdrawn again and the machine is ready to accept a third bale; this is the condition shown in FIG. 2.

The third bale is compressed. If the total compressed length of the three bales is in excess of the standard length of a bale the additional length is accommodated by the extra withdrawal distance provided by the relief ram. At the end of the third compression stroke the compression ram 6 remains extended while the binder mechanism operates. The piston 10 prevents bulging at the centre of the compressed bale which would occur if only the chocks 15 were holding the bale. Further the recesses 17 in the piston 10 act as guides for the needles 18 ensuring that the needles are held aligned with the apertures 22 in the floor of the chamber. After binding the compressed bale the relief ram 7 is withdrawn and the new high density bale drops down through the opening 28 in the floor of the chamber. A conveyor may be placed beneath the opening to carry away the bale. Automatic handling equipment may also be used for feeding conventional bales to the machine.

Although the machine is capable of producing a single high density bale of standard dimensions from three conventional bales it may also be used to produce high density bales of one third or two thirds of the length of standard bales from one or two conventional bales. The control gear may be arranged so that it can be pre-set to initiate the binding sequence after one, two or three compression strokes in succession according to the size of finished bale required.

We claim:

1. The method of increasing the density of bales of fibrous material comprising the steps of clamping a previously prepared bale of fibrous material between a piston having a preset stroke and a backing plate movable between advanced and retracted positions relative to said piston, applying to said backing plate in opposition to said compression force a constant reaction force which is less than the maximum compression force exertable by said piston, and limiting the density increase of said bale to a predetermined level by movement of said backing plate from an advanced position towards a retracted position against said constant reaction force when the latter is exceeded by the compression force exerted by said piston.

2. The method of claim 1 including the step of binding said compressed bale before retracting said piston.

3. The method or claim 1 including the steps of restraining the end of the compressed bale opposite said backing plate separately from said piston, retracting said piston, clamping a second bale between said piston and the restrained end of the first bale, applying a compression force to said piston to compress said second bale against said first bale, and limiting the density increase of said second bale to said predetermined level of said first bale by further movement of said backing plate towards said retracted position against said constant reaction force when the latter is exceeded by the compression force exerted by said piston on said second bale.

4. The method of claim 1 and repeating the steps for a plurality of bales compressed together sequentially including the steps of restraining the end remote from said backing plate of each compressed bale and thereafter retracting said piston, clamping each bale subsequent to the first bale between said piston and the restrained end of the preceding bale, applying a compression force to each subsequent bale to compress it against the preceding compressed bale, limiting the density increase of each of said subsequent bales to said predetermined level of the first bale by further movement of said backing plate towards said retracted position against said constant reaction force when the latter is exceeded by the compression force exerted by said piston on each subsequent bale, and thereafter binding all of the compressed bales together to form a single compressed bale.

5. The method of claim 4 wherein the constant reaction force is selected that the length of a plurality of bales compressed together is substantially equal to the length of a single bale.

* * * * *